INVENTOR
BELA BARENYI

May 27, 1969   B. BARENYI   3,446,528
MOTOR VEHICLE TOP CONSTRUCTION
Original Filed May 25, 1965   Sheet 2 of 4

INVENTOR
BELA BARENYI

BY Dicke + Craig
ATTORNEYS

May 27, 1969  B. BARENYI  3,446,528
MOTOR VEHICLE TOP CONSTRUCTION
Original Filed May 25, 1965  Sheet 4 of 4

INVENTOR
BELA BARENYI

BY Dicke & Craig
ATTORNEYS.

United States Patent Office 3,446,528
Patented May 27, 1969

3,446,528
MOTOR VEHICLE TOP CONSTRUCTION
Bela Barenyi, Stuttgart-Vaihingen, Germany, assignor to Daimler-Benz Aktiengesellschaft, Stuttgart, Germany
Continuation of application Ser. No. 458,615, May 25, 1965. This application Nov. 30, 1967, Ser. No. 687,913
Claims priority, application Germany, May 30, 1964, D 44,571
Int. Cl. B62d 25/06
U.S. Cl. 296—137                                   19 Claims

ABSTRACT OF THE DISCLOSURE

The present disclosure relates in general to motor vehicle body constructions, and more particularly is directed to a convex-shaped motor vehicle roof or top, especially suited for carrying luggage or other items. The roof is concave in its central portion for carrying luggage and convex in its peripheral connection to the remaining portions of the vehicle.

---

This application is a continuation of application Ser. No. 458,615, filed May 25, 1965 by the same inventor and now abandoned.

The vast majority of motor vehicles being manufactured today have a convex-shaped vehicle roof or top, which has received wide acceptance for its aerodynamic and ascetic qualities. As a result, the production of most automobile factories is standardized to convex vehicle tops of this type, so that it is frequently very difficult, or at least produces very considerable expenditures, to convert the production to other advantageous vehicle top configurations. These expenditures relate not only to the actual production of the new shaped top, but also relate to the necessary change in the interconnecting parts between the top and the other portions of the vehicle body, so that a major change of this type necessarily requires a complex alteration in manufacturing procedures and equipment.

At least due in part to the above-mentioned difficulties, the known concave-formed motor vehicle top such as disclosed in German Patent 1,069,088 which extends over the entire width of the motor vehicle and is considerably more desirable with respect to the loading or carrying capacity thereof, has not received the type of acceptance which its many advantages merit. It has also been proposed to provide a concave roof or top portion extending over the entire width of the motor vehicle but only along a portion of the length thereof with the remaining part of the motor vehicle top being in the convex form. These known concave tops are on occasion connected with the other portions of the vehicle superstructure, particularly the windows, by means of differently shaped ribs such as disclosed in Australian Patent 233,822. However this provision of separate ribs and other special interconnecting parts has proven very disadvantageous.

It is therefore a primary objective of the present invention to increase the loading or carrying capacity of convex motor vehicle tops and to improve the headroom in the passenger compartment of the motor vehicle without changing or replacing the normally used convex shaped connecting parts between the roof construction and the remainder of the vehicle superstructure. In order to achieve this purpose, the present invention substantially proposes that the roof or top be provided with an inwardly or centrally positioned top portion which is of concave configuration when viewed in the cross section thereof, and which is narrower and shorter than the dimensions of the overall top construction so that the transition portions of the roof coincide with the normally provided convex shaped connecting parts. This arrangement results in a roof or top which may be made particularly sturdy without deviation from the existing tools and connecting parts of the remainder of the vehicle body and which provides for increased headroom in a vehicle passenger compartment as compared to the room provided by the normally utilized convex roof construction. The concave portion of the roof or top construction in accordance with the invention may advantageously be cylindrical or may have the shape of a shoe horn. A shoe horn shape, as used in the present specification, refers to a compound curved surface having a convex shape in the direction of vehicle travel and a concave shape transverse to the direction of vehicle travel in the manner of the foot and shoe-engaging portion of a compound curve shoe horn.

According to a further embodiment of the present invention, it is proposed that the concave top portion of the roof construction be supported with regard to the convex outer portion by means of web portions which are formed integral with the roof construction so that a very advantageous and stable construction is attained thereby. However, in accordance with the invention, the concave top portion may also advantageously be provided in a removable, displaceable or hinged manner so that an opening in the roof is available for purposes of ventilation, while nevertheless, with the existing concave roof portion in place, a large loading or carrying capacity and direct bearing strength of the roof will be provided. In such an arrangement, the provision may advantageously be such that the web portions are rigidly connected with the concave roof or top portion or are made of one piece therewith.

It is also possible in accordance with the invention that the concave roof portion be designed so as to be inserted into a pre-existing opening in the vehicle roof, provided on some vehicles with a sliding closure member. This arrangement makes it possible to utilize the invention in an especially simple manner with motor vehicles already provided with the necessary opening such that these vehicles can be quickly and simply provided with means for carrying heavy loads without unnecessary utilization of space within the passenger compartment, and without having to make any special changes on the motor vehicle. Of course, it is also possible without great difficulty to form from a convex top of an already existing motor vehicle a concave roof portion, which may be fitted to the convex vehicle top by means of sealing members.

According to a further embodiment of the present invention, the concave top portion may be connected with the convex outer portion in the manner of a windshield by means of an elastic sealing strip. The concave portion may also be provided with and include rims which extend beyond web portions arranged on the convex roof portion and under which a sealing ledge is positioned, preferably in a concave surface. The concave section may, however, also be made separately and inserted within the web portions either rigidly, detachably, displaceably, or hingedly.

An advantageous embodiment of the present invention provides that the concave part of the vehicle top be provided of synthetic material, preferably a transparent or transluscent synthetic material. In this way, an additional window is provided in the vehicle allowing light to enter into the passenger compartment from above and providing a view to the outside through the roof of the vehicle.

In providing a central concave roof portion either integral with or removable from the vehicle roof, an upwardly bent rim is preferably provided in the convex top portion adjacent to the centrally disposed concave portion, which rim provides a hollow space under the concave top portion which may be utilized for guide bars, holding straps, air guiding means, lights, cable, storage areas and many other items which must be provided on the vehicle but are preferably to be hidden from view. Also, tubes projecting from the hollow space may preferably be provided as luggage bridge members and apertures in this rim portion may be utilized for providing outside air to the interior of the vehicle passenger compartment or for evacuating air from within the vehicle passenger compartment.

It is therefore an object of the instant invention to provide a vehicle roof or top construction which advantageously eliminates all of the inherent difficulties encountered with prior art constructions of a similar type by simple and relatively inexpensive means.

It is another object of the present invention to provide a top structure for a vehicle body in which the roof is provided with a centrally disposed concave portion forming an integral part of the overall roof construction.

Another object of the present invention resides in the vehicle top having a centrally disposed concave portion integral with the outer convex portion which essentially conforms to the normal convex interconnecting parts associated with roof constructions which are entirely convex in form.

Still a further object of the present invention resides in the provision of a vehicle top which is provided with a centrally disposed concave portion which cooperates with essentially convex interconnecting parts in such a manner as to increase the headroom normally provided in the vehicle passenger compartment.

It is still another object of the present invention to provide a vehicle top construction which includes a removable centrally disposed concave portion supported on a generally convex vehicle top.

It is still another object of the instant invention to provide a vehicle top construction including a centrally disposed concave portion capable of withstanding heavy loads and being provided as a removable transparent member.

These and other objects, features, and advantages of the present invention will become more obvious from the following description when taken in connection with the accompanying drawing which shows, for purposes of illustration only, several embodiments in accordance with the present invention and wherein.

Figure 1:
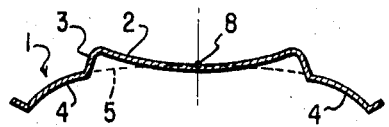
FIGURE 1 is a cross-sectional view through a motor vehicle top made of one piece and constructed in accordance with the present invention.
Figure 2:
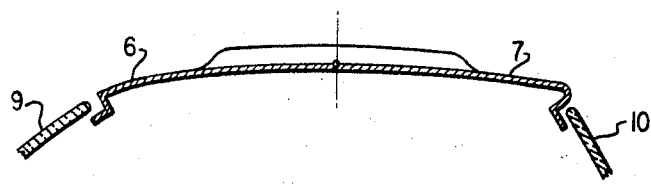
FIGURE 2 is a longitudinal cross sectional view through the motor vehicle top according to FIGURE 1 with the adjacent panes being visible therein.

Referring now to the drawing, wherein like reference numerals are used throughout the various views to designate corresponding parts, and more particularly, to FIGURES 1 and 2, which shows an embodiment of the present invention wherein a convex shaped roof or top 1 includes a concave top portion 2 which is formed integral with the convex portions thereof. This concave top portion 2 passes over into a lateral, convex shaped parts 4 with the transition web portions 3 being approximately vertically positioned. The dotted line 5 indicates in FIGURE 1 the extension of the curvature of the lateral parts 4 and illustrates the line of the normal convex roof construction. FIGURE 1 illustrates only the cross sectional configuration of the vehicle top in a transverse plane without illustration of the changing curvature of the concave portion 2 or the web portions 3 beyond the section line in order to prevent undue confusion in the illustration.

It is apparent from FIGURE 2 that the concave formed roof or top portion 2, when viewed in the longitudinal cross section thereof, is slightly convex in shape and passes over continuously into the front and rear roof or top portions 6 and 7. This facilitates the drainage of water from the roof and also materially improves the aerodynamic characteristics of the arrangement. The concave, shoe-horn like part 2 thus extends only over a part of the length of the roof and a part of the width thereof so that the concave portion occupies only the center of a generally convex shaped roof of normal configuration so that little difficulty is encountered in meeting or connecting the roof to the other portions of the vehicle superstructure.

The concavely shaped roof portion has a particularly high loading or carrying capacity which is particularly reinforced by the web portions 3. The web portions 3 are angularly bent in each case with respect to the lateral convex portions 4 and the concave roof portion 2 and thus, viewed in the overall length thereof, constitutes reinforcement of the roof which is resistant to bending. When the concave roof or top portion 2 is loaded, any reduction of the distance between the two web portions 3 is counteracted since these web portions 3 pass over, at the ends thereof, into the end portions 6 and 7 with approximately triangular shaped gussets resulting in a further reinforcement of the lateral web portion 3 and thus increases the carrying or loading capacity of the roof or top.

The lowest point 8 of the center of the concave roof or top portion 2 substantially coincides with the highest point of the curvature of the convex roof portion 4, as is clearly apparent from FIGURES 1 and 2, which as described below facilitates drainage therefrom. Provided, in a conventional manner, adjacent the roof portions 6 and 7 are the front window pane 9 and the rear window pane 10. In its connection to the windows and the remaining parts of the vehicle body, the top proposed by the present invention is thus little different from generally used convex roofs whose carrying capacity, however, is very limited. It may thus be mounted selectively with purely convex-shaped roofs or tops in otherwise completely similar motor vehicles, or it may be provided exclusively without requiring a large change-over in the production procedure or equipment. It may, on the other hand, also be provided or formed in already existing and available motor vehicles in a very simple manner.

Figure 3:
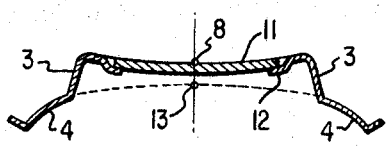
FIGURE 3 is a cross sectional view through the vehicle top with the concave top portion from synthetic material being inserted within the web portions.
Figure 4:
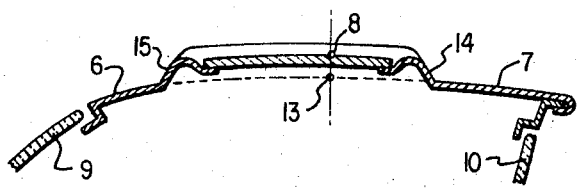
FIGURE 4 is a central longitudinal cross sectional view of the top according to FIGURE 3.

The embodiment according to FIGURES 3 and 4 shows essentially the same type and design as the embodiment of FIGURES 1 and 2. However, it differs from the first embodiment particularly in that the concave top part is provided as a separately made element 11 which consists of preferably transparent or translucent synthetic material. The element 11 may be rigidly connected with, for example, glued to, the support flange or bases 12; however, it may also be provided either as a removable, or hinged, or displaceable element in any well known or conventional manner. Since it rests on the support flange or bases 12 on all sides and is concavely shaped, it has a very great carrying or loading capacity due to its shape in spite of the fact that it is made from transparent synthetic material. Thus, a top is made and obtained which, when in the unloaded condition thereof, allows the light to freely pass and permits a view toward the outside, while it may nevertheless and without changes be used for transporting luggage.

In deviation from the graphic representation in the drawing which is not true to scale, the transitional areas to the adjacent web portions are provided in such a manner and, if desired, filled so that no water can collect between the supports or bases 12 and the rims of the plate 11. A good discharge or draining of the water is also obtained due to the fact that the lowest point 8 of the center of the top of the concave top portion 11 is positioned above the imaginary high point 13 of the convex shaped top part and, respectively, the extension thereof. As a result thereof, the water runs off (is drained) very easily from the concave top part in the forward or rearward direction of the vehicle. In addition, the general convex longitudinal contour of the shoe horn shaped portion facilitates this drainage.

A further reinforcement of the top, as compared to the first example, is achieved by virtue of the web portions 14 and 15 being provided between the supports or bases 12 and the top parts 6 and 7. Additionally, the connection of the rear window pane 10 is different from the representation in FIGURE 1 inasmuch as the pane 10 is inclined outwardly at the top thereof.

Figure 5:
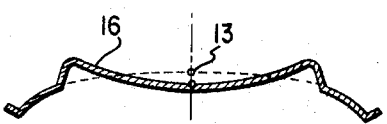
FIGURE 5 is a cross sectional view of a further embodiment of a top in accordance with the present invention.
Figure 6:
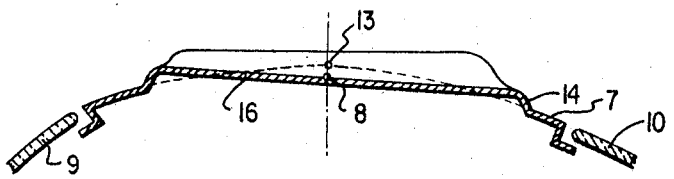
FIGURE 6 is a central longitudinal cross sectional view of the top according to FIGURE 5.

The embodiment according to FIGURES 5 and 6 is largely identical with the embodiment of FIGURES 1 and 2, but differs therefrom in that the concave-shaped top part 16 is of cylindrical rather than shoe horn-like configuration and is arranged in a downwardly inclined manner in a direction toward the rear part of the motor vehicle. As a result thereof, the lowest point of the center of the concave top part 16 is provided below the imaginary high point 13 of the concave top part, and, respectively, the extension thereof. Because of the inclined arrangement of the concave top part, however, and despite this relative position of points 8 and 13, a perfect drainage of the water is assured in that the end of the element 16 is positioned still above the connecting part 7 of the convex top. Also in this area a small web portion 14 will thus be formed over which the water may faultlessly drain and which contributes to the reinforcement of the top. The connection of the windshields 9 and of the rear window panes 10, in turn, is made in the conventional manner so that the design according to this embodiment also may be employed with advantage for customary motor vehicles.

Figure 7:
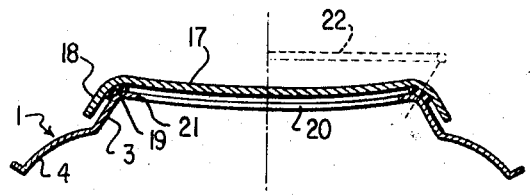
FIGURE 7 is a cross sectional view through a motor vehicle top wherein the rims of the concave top portion extend beyond the web portions of the convex top portion.

The embodiment according to FIGURE 7 shows a removable, concave-shaped top part 17 which may be made preferably from transparent or translucent synthetic material. This part comprises at the outside thereof rims 18 which are angularly bent in the downward direction and supported on a sealing ledge 19 positioned in sealing contact with web portions 3 of the convex portion of the top 1, these web portions being upwardly angularly bent from the convex rims 4. Short angularly bent sections 21 extend from the web portions 3 up to the top opening 20 and produce a further reinforcement of the top and of the web portions 3. The changing contour of the rear and, respectively, front part of the top has been omitted from the drawing for purposes of greater clarity of illustration. The concave top part of this embodiment may be provided both cylindrically and in a shoe horn-like manner. For the further support of luggage positioned on the top part 17, a baggage rack 22 may be provided, as has been shown in the right half of FIGURE 7. This allows a piling up of luggage which is permitted in view of the structural strength of the roof construction in accordance with the invention.

Figure 8:
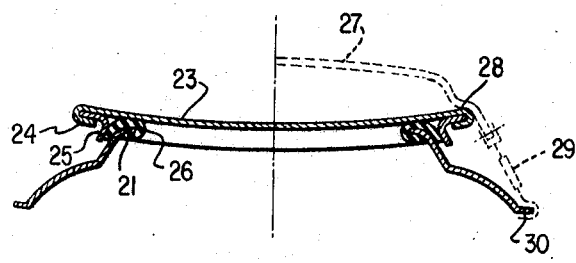
FIGURE 8 is a cross sectional view through a further top provision, wherein rims being secured to the concave top portion and projecting downwardly extend beyond the web portions of the convex top portion and wherein a luggage compartment is closed off, above the concave top, by hood means.

The embodiment of according to FIGURE 8 differs from that of FIGURE 7 essentially in that the concave top part 23 is provided as a detachable structural element made from sheet metal, which part 23 is secured to a flanged-in angular frame 25, by flange portion 24 or other suitable conducting means. This structural element rests on a sealing member 26 which extends beyond the marginal strip 21 and centers the top part 23, which may be either cylindrical or shoe horn shaped in general configuration. In the right half of FIGURE 8 there is illustrated a lid 27 which is supported on the edge 28 of the top part 23, and which closes off a baggage space above the concave part 23. The lid 27 is secured to the top edges 30 with the air of elastic clamping means 29 or other suitable securing means.

Figure 9:
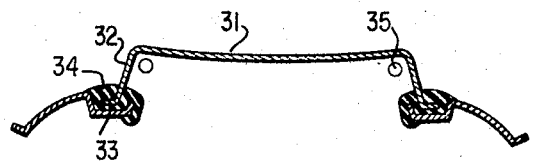
FIGURE 9 is a cross sectional view through a concave top portion being inserted with a sealing in the manner of a windshield.

The embodiment according to FIGURE 9 shows a concave top part 31 which is equipped with integral web portions 32 extending downwardly almost vertically and also includes an approximately horizontal angularly bent section or part 33. The top part 31 is inserted, in the manner of a windshield, in a conventional opening for a sun roof by means of a corresponding sealing ledge 34. A top part 31 of this type being very well adapted to carrying loads may be made, if desired, from transparent and translucent material and employed without any changes or permanent alterations of the motor vehicle after the removal of the conventional sun roof. The spaces formed in the corners between the concave top surface 31 and the web portions 32 may again—as also in the other embodiments—be used advantageously for mounting holding straps or bars, or air inlet and air outlet openings, or the cross pipes 35 of a baggage rack.

Figure 10:
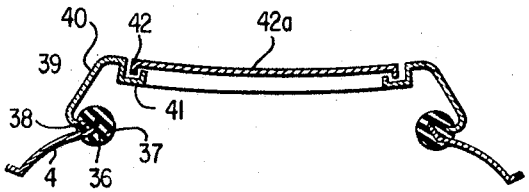
FIGURE 10 shows a top which is provided with a sliding roof in the concave top portion.

The embodiment according to FIGURE 10 shows an easily detachable structural group of elements forming a concave top part which is equipped with a sliding roof. The lateral parts 4 of the convex top comprise merely approximately vertically positioned short web portions 36 between which a large roof opening is formed. Drawn across the web portions 36 is a sealing ledge of circular cross section which is provided with two grooves, one groove of which engages web portion 36 and the second groove of which engages an angularly bent portion 38 of the web portion 39 of the frame 40.

The frame 40 has, at the upper part thereof, U-shaped angularly bent channel portions 41 into which engage the legs 42 of the concave sliding roof part 42a. This structural group allows for an easy interchange between this sliding roof construction and the solid roof construction of the type illustrated, for example, in FIGURE 9.

Figure 11:
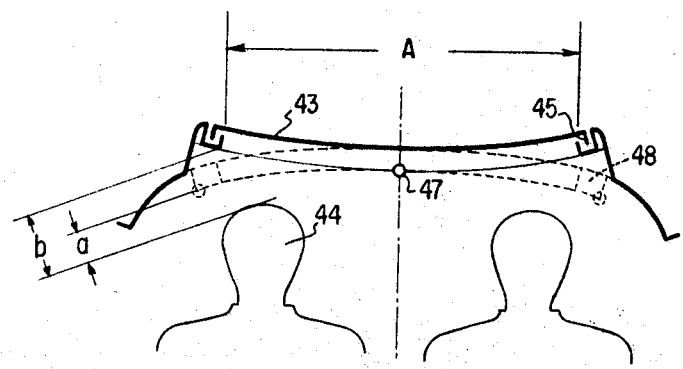
FIGURE 11 is a schematic illustration of the gain in space with the provision of a top according to the present invention, which top is provided as sliding roof.
Figure 12:
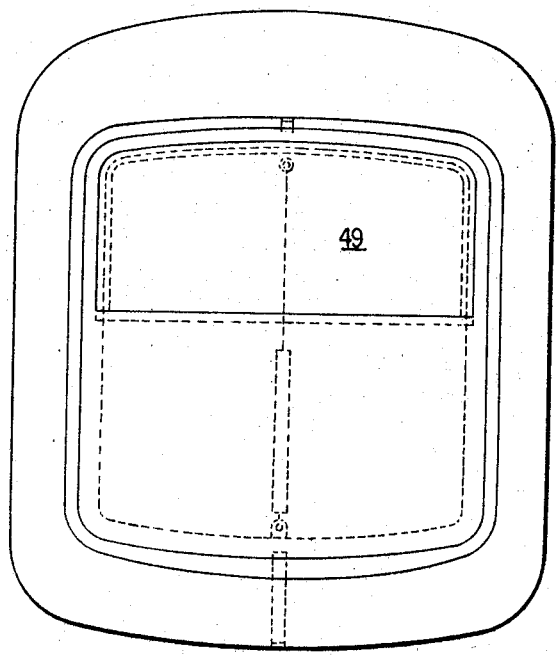
FIGURE 12 is a top plan view of the construction according to FIGURE 11.

The embodiment according to FIGURES 11 and 12 illustrates, in the cross-sectional representation of FIGURE 11, the gain in headroom and space due to the use of the vehicle top construction as proposed by the present invention. The concave top part 43 extends over a greater width of the top than the outer distance A of the heads 44 of the passengers would amount to. Beyond the distance A, a rectangular space 45 is indicated in each case within which the guides for sliding roofs or the like are housed. An analogous arrangement with the overall space required therefor for a sliding roof in a conventional convex top is indicated in dash-dotted lines, and the height of the center 47 of the inner top part is therein maintained. With the same overall dimensions required for the guides of a sliding roof, which has been indicated at 48 in the dash-dotted arrangement, the head space and freedom is increased by the use of the top as proposed by the present invention from the amount $a$ to the amount $b$. FIGURE 12 illustrates schematically and in a top plan view a sliding roof arrangement according to FIGURE 11 wherein the area 49 represents the opening which may be closed by the sliding roof.

Figure 13:
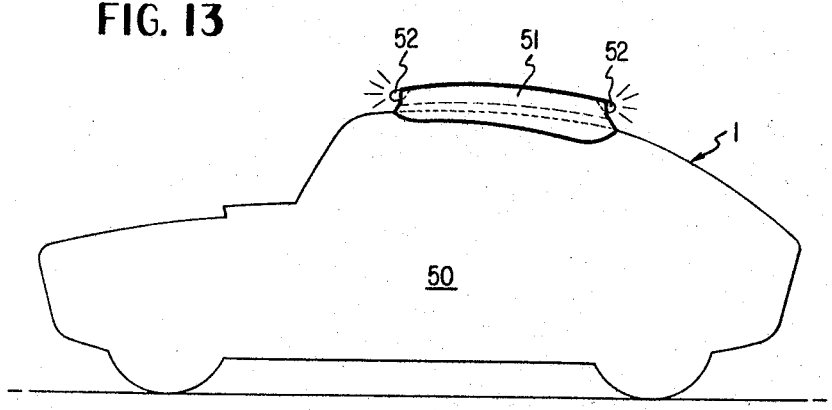
FIGURE 13 is a lateral view of a schematically illustrated motor vehicle with a top or roof portion according to the present invention.
Figure 14:
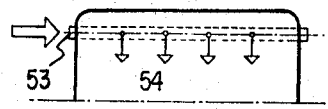
FIGURE 14 is a schematic top plan view of a roof or top part half with the air inlet opening.

FIGURE 13 illustrates schematically a motor vehicle 50 being equipped with a concave top 1 upon which a shoe horn-shaped top part 51 according to the present invention is mounted. The corners being formed at the ends of the concave top part may advantageously be used for the provision of four signal lights 52. As shown in FIGURE 14, however, an air inlet 53 may also be provided in the corner which extends in a tube-like manner through the spaces being formed in the corners of the concave top part and which allows air to be supplied from outside through suitable openings into the passenger spaces in the direction of the arrows 54.

Figure 15:
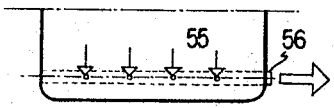
FIGURE 15 is a schematic top plan view of a roof or top part half with the air outlet opening.

FIGURE 15 shows how a corner space being formed under the concave top part may also be used for the removal or outlet of the air from the motor vehicle. The air enters, in the direction of arrows 55, into apertures in a tube extending through the corner of the concave top part and terminating into the atmosphere with the opening thereof at the rear end 56 of the concave top part in the corners. By means of a concave top part being attached in this manner or subsequently provided, an additional and very advantageous ventilation of the motor vehicle may thus be attained.

Figure 16:
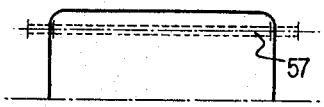
FIGURE 16 is a schematic top plan view of a roof or top part half with a supporting rod provided thereon.
Figure 17:
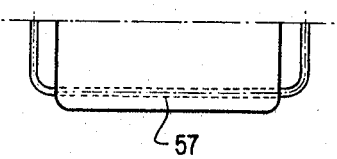
FIGURE 17 is a schematic top plan view of a roof or top part half with inwardly positioned tube parts which continue outwardly for the formation of saddle means and are bent off.

FIGURE 16 illustrates how a holding rod 57 extends through the corner space below the concave top part. The ends thereof project from the corners of the concave top part and may be used for the connection to baggage racks. FIGURE 17 finally illustrates how such inwardly positioned holding rods may be provided outwardly as a baggage rack by being angularly bent.

The present invention is not limited to the embodiments shown herein, and the features of some embodiments may particularly also be combined with elements of other embodiments within the scope of teachings of the invention.

1. A vehicle body top, especially for passenger motor vehicles, having a longitudinal direction aligned with the driving direction and a transverse direction perpendicular thereto comprising: roof means including a centrally disposed carried portion and a surrounding connection portion; said carrier portion having a central major portion being concave when viewed from the exterior of the vehicle in cross-section transverse to said vehicle; said connecting portion being convex in transverse cross section when viewed from the exterior of the vehicle; said carrier portion having two longitudinally extending side minor portions connecting said central major portion to said connecting portion and extending upwardly at a sharper angle, with respect to the vertical, than and from said connecting portion to said major portion, on respective sides of the vehicle; each of said side minor portions having its outside surface facing away from the center of the vehicle roof means; said concave carrier portion being longitudinally shorter and transversely narrower in size than the overall dimensions of said roof means; said connecting portion having a convex outer surface with a tangent in a transverse vertical plane intersecting said concave carrier portion.

2. A vehicle body top, according to claim 1, wherein said concave carrier portion is generally cylindrical in shape.

3. A vehicle body top, according to claim 1, wherein said concave carrier portion is generally shoe horn shaped.

4. A vehicle body top, according to claim 1, said concave carrier portion and said convex connection portion being provided as a single homogeneously integral member.

5. A vehicle body top, according to claim 1, said concave carrier portion being removably supported upon said convex connecting portion.

6. A vehicle body top, according to claim 5, elastic sealing ledge means interconnecting said concave carrier portion with said convex connecting portion in a sealed manner.

7. A vehicle body top, according to claim 4, said concave carrier portion including rim means extending beyond said side minor portions on said convex connecting portion, and sealing ledge means positioned on said side minor portions in sealing contact with said concave carrier portion.

8. A vehicle body top, according to claim 5, said concave carrier portion being formed of a synthetic transparent material.

9. A vehicle body top, according to claim 1, elastic sealing ledge means interconnecting said concave carrier portion with said convex connecting portion in a sealed manner, said convex connecting portion including an upwardly extending rim portion operatively connected to said sealing ledge means.

10. A vehicle body top, according to claim 4, said concave carrier portion being generally shoe horn shaped.

11. A vehicle body top, according to claim 1, elastic sealing ledge means interconnecting said concave carrier portion with said convex connecting portion in a sealed manner, said concave carrier portion being formed of a synthetic transparent material.

12. A vehicle body top, according to claim 4, said web portions being hollow and accommodating at least guide bars, air duct means, and lights.

13. A vehicle body top, according to claim 12, tube means projecting from said side minor portions for providing baggage bridge elements.

14. A vehicle body top, according to claim 2, said concave carrier portion slanting downwardly in a rearward direction of the vehicle.

15. A vehicle body top, according to claim 3, the lowest point of said concave carrier portion being positioned above the imaginary point forming the highest part of said convex connecting portion when forming a complete surface.

16. A vehicle body top, according to claim 1, said side minor portions including conduit means communicating with the outside of the vehicle and including ventilating apertures communicating with the inside of the vehicle for introducing and withdrawing fresh air therefrom.

17. The device of claim 1, including generally vertically extending vehicle side wall portions having side windows, a generally vertically extending windshield portion and a generally vertically extending rear window portion; said connecting portion extending substantially horizontally and being connected to all of said generally vertically extending portions about its entire periphery.

18. The device of claim 17, wherein said connecting portion presents one continuous curved surface about its entire periphery.

19. The device of claim 1, wherein the lowest point of said concave carrier portion substantially corresponds with the imaginary point forming the highest part of said convex connecting portion when extended to form a complete surface.

References Cited

UNITED STATES PATENTS 3,169,793 2/1965 Barenyi et al. _____ 296—137
3,197,252 7/1965 Wilfert et al. _____ 296—137

BENJAMIN HERSH, *Primary Examiner.*

JOEL E. SIEGEL, *Assistant Examiner.*